(12) United States Patent
Waltermann et al.

(10) Patent No.: US 9,323,944 B2
(45) Date of Patent: Apr. 26, 2016

(54) CONFORMING PASSWORDS TO A PASSWORD POLICY

(71) Applicant: LENOVO (Singapore) PTE, LTD., New Tech Park (SG)

(72) Inventors: Rod D. Waltermann, Rougemont, NC (US); John Carl Mese, Cary, NC (US); Nathan J. Peterson, Durham, NC (US); Russell Speight VanBlon, Raleigh, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 107 days.

(21) Appl. No.: 14/012,690

(22) Filed: Aug. 28, 2013

(65) Prior Publication Data

US 2015/0067760 A1    Mar. 5, 2015

(51) Int. Cl.
*G06F 21/62* (2013.01)
*G06F 21/46* (2013.01)
*G06F 21/00* (2013.01)
*H04L 9/00* (2006.01)
*H04L 29/06* (2006.01)

(52) U.S. Cl.
CPC ............ *G06F 21/6218* (2013.01); *G06F 21/46* (2013.01); *G06F 21/00* (2013.01); *H04L 9/00* (2013.01); *H04L 63/083* (2013.01)

(58) Field of Classification Search
USPC ............ 726/1, 7, 9, 18, 19, 20; 713/155, 159, 713/183
See application file for complete search history.

(56) References Cited

U.S. PATENT DOCUMENTS

| 7,367,053 | B2 | 4/2008 | Sanai et al. | |
|---|---|---|---|---|
| 7,934,101 | B2 | 4/2011 | Stieglitz et al. | |
| 8,108,932 | B2 | 1/2012 | Himberger et al. | |
| 2003/0041251 | A1* | 2/2003 | Kumhyr | 713/184 |
| 2004/0073815 | A1* | 4/2004 | Sanai et al. | 713/202 |
| 2009/0150677 | A1* | 6/2009 | Vedula et al. | 713/183 |

\* cited by examiner

*Primary Examiner* — Brandon Hoffman
*Assistant Examiner* — Samuel Ambaye
(74) *Attorney, Agent, or Firm* — Kunzler Law Group

(57) ABSTRACT

An apparatus, program product, and method are disclosed for receiving a password entered by a user, the password not conforming to one or more requirements of a password policy, manipulating the password to create one or more compliant passwords conforming to the one or more requirements of the password policy, and presenting a list of the one or more compliant passwords to the user wherein a compliant password is selectable by the user.

20 Claims, 7 Drawing Sheets

CONFORMING PASSWORDS TO A PASSWORD POLICY

FIELD

The subject matter disclosed herein relates to strengthening passwords and more particularly relates to conforming passwords to a password policy.

BACKGROUND

Description of the Related Art

In general, passwords are used to prove an identity of a user, who may need to present a password to gain access to a resource that requires authorization. In some circumstances, a user may create a password to protect sensitive information, data, etc. Many software programs, such as operating systems, websites, applications, and online services, require a user to create a user account, which usually includes both a username and password.

Commonly, software programs enforce password policies that define the requirements a password must conform to in order to be considered valid. Examples may include a minimum password length, including both upper- and lower-case letters, including numeral and/or special characters, etc. Software programs, however, may maintain different password policies, which are usually unknown to the user creating the password or are difficult to remember. This can be frustrating for the user because it typically requires trying various permutations of characters until the user enters a password that conforms to the password policy.

BRIEF SUMMARY

A method for conforming passwords to a password policy is disclosed. An apparatus and computer program product also perform the functions of the method.

In one embodiment, a method is described that includes receiving a password entered by a user. In another embodiment, the password does not conform to one or more requirements of a password policy. In a further embodiment, the method includes manipulating the password to create one or more compliant passwords conforming to the one or more requirements of the password policy. The method, in another embodiment, includes presenting a list of the one or more compliant passwords to the user such that a compliant password is selectable from the list by a user.

In one embodiment, the method includes updating the list of the one or more compliant passwords in response to the password being modified. In another embodiment, the list is updated in response to a predefined period of time expiring since modification of the password. In a further embodiment, the one or more compliant passwords include the characters entered by the user and one or more additional characters. In certain embodiments, the one or more additional characters conforms the password to the one or more requirements of the password policy.

In one embodiment, the method includes assigning a password strength rating to the one or more compliant passwords such that the one or more compliant passwords are listed in order of password strength rating. In certain embodiments, the password strength rating is associated with the password policy. In another embodiment, the method includes confirming the password selected from the list of one or more passwords.

The method, in one embodiment, includes calculating the time required to crack each compliant password based on a password cracking scheme. In some embodiments, the time required to crack is presented in the list alongside a related compliant password.

In one embodiment, manipulating the password further includes appending one or more characters to the end of the password. In certain embodiments, the one or more appended characters conforms the password to the one or more requirements of the password policy. In another embodiment, manipulating the password further includes pre-pending one or more characters to the beginning of the password. In some embodiments, the one or more pre-pended characters conforms the password to the one or more requirements of the password policy.

In one embodiment, manipulating the password further includes inserting one or more characters between the first character and the last character of the password. In another embodiment, the one or more inserted characters conforms the password to the one or more requirements of the password policy. In certain embodiments, manipulating the password further includes substituting one or more characters in place of one or more characters of the password. In some embodiments, the one or more substituted characters conforms the password to the one or more requirements of the password policy.

The apparatus, in one embodiment, includes a processor and a memory storing machine readable code executable by the processor. In one embodiment, the machine readable code includes a password reception module receiving a password entered by a user. In another embodiment, the password does not conform to one or more requirements of a password policy. In a further embodiment, the machine readable code includes a password manipulation module manipulating the password to create one or more compliant passwords conforming to the one or more requirements of the password policy. In certain embodiments, the machine readable code includes a password presentation module presenting a list of the one or more compliant passwords to the user. In one embodiment, a compliant password is selectable from the list by a user.

The machine readable code, in one embodiment, includes an update module updating the list of the one or more compliant passwords in response to the password being modified. In another embodiment, the list is updated in response to a predefined period of time expiring since modification of the password. In some embodiments, the machine readable code includes a strength assignment module assigning a password strength rating to the one or more compliant passwords wherein the one or more compliant passwords are listed in order of password strength rating. In one embodiment, the password strength rating is associated with the password policy.

The machine readable code, in another embodiment, includes a password confirmation module confirming the password selected from the list of one or more passwords. In certain embodiments, the machine readable code includes a cracking calculation module calculating the time required to crack each compliant password based on a password cracking scheme. In some embodiments, the time required to crack is presented in the list alongside a related compliant password. In one embodiment, the password reception module receives a touch pattern password entered by the user. In some embodiments, the touch pattern password does not conform to one or more touch pattern password requirements of the password policy.

In one embodiment, the manipulation module manipulates the password by appending one or more characters to the end of the password. In certain embodiments, the one or more appended characters conforms the password to the one or more requirements of the password policy. In another embodiment, the manipulation module manipulates the password by pre-pending one or more characters to the beginning of the password. In some embodiments, the one or more pre-pended characters conforms the password to the one or more requirements of the password policy.

In one embodiment, the manipulation module manipulates the password by inserting one or more characters between the first character and the last character of the password. In another embodiment, the one or more inserted characters conforms the password to the one or more requirements of the password policy. In certain embodiments, the manipulation module manipulates the password by substituting one or more characters in place of one or more characters of the password. In some embodiments, the one or more substituted characters conforms the password to the one or more requirements of the password policy.

A program product is disclosed including a computer readable storage medium storing machine readable code executable by a processor to perform the operations. In one embodiment, the operations include receiving a password entered by a user. In another embodiment, the password does not conform to one or more requirements of a password policy. In another embodiment, the operations include manipulating the password to create one or more compliant passwords conforming to the one or more requirements of the password policy. In certain embodiments, the operations include presenting a list of the one or more compliant passwords to the user. In one embodiment, the user selects a compliant password from the list.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
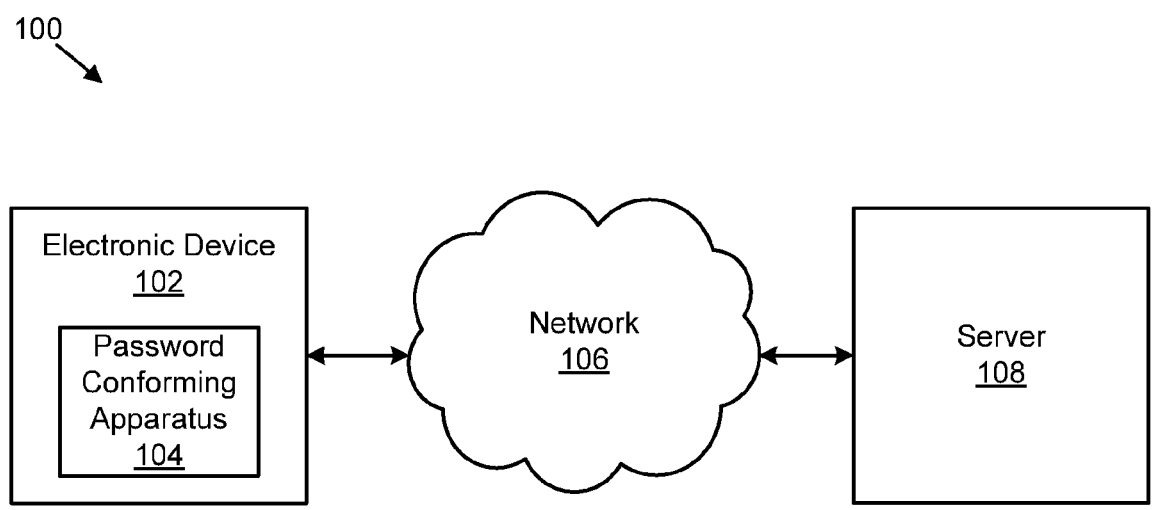
FIG. 1 is a schematic block diagram illustrating one embodiment of a system for conforming a password to a password policy in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements. FIG. 1 is a schematic block diagram illustrating one embodiment of a system 100 for conforming a password to a password policy. In one embodiment, the system 100 includes an electronic device 102, a password conforming apparatus 104, a network 106, and a server 108, which are described below in more detail.

In one embodiment, the system 100 includes an electronic device 102. The electronic device 102, in one embodiment, includes a laptop computer, a desktop computer, a smart phone, a tablet, a mainframe, a smart TV, a touch device, a monitor, or any electronic device 102 capable of conforming passwords to a password policy. In certain embodiments, the electronic device 102 includes one or more input devices, such as a mouse, keyboard, touchscreen, stylus, microphone, digital camera, or the like. A user, in some embodiments, uses an input device to enter a password into a password field as part of a user interface presented on a display of an electronic device 102.

The password conforming module 104, in one embodiment, receives a password entered by a user and checks to see whether the password conforms to a password policy. In certain embodiments, if the password does not conform to the password policy, the password conforming module 104 presents to the user one or more compliant passwords that do conform to the password policy. The compliant passwords, in certain embodiments, maintain at least a portion of the password entered by the user, e.g., some compliant passwords may include one or more characters entered by the user. In some embodiments, the compliant passwords may not contain any characters entered by the user. In one embodiment, the user selects a compliant password and the password conforming module 104 confirms the compliant password by receiving a password entered in a password confirmation field. The password conforming module 104 is described below in more detail with reference to FIGS. 2 and 3.

The system 100, in another embodiment, includes a network 106. The network 106, in certain embodiments, is a digital communication network 106 that transmits digital communications related to conforming a password to a password policy. The digital communication network 106 may include a wireless network, such as a wireless telephone network, a local wireless network, such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network known in the art. The digital communication network 106 may include two or more networks. The digital communication network 106 may include one or more servers, routers, switches, and/or other networking equipment. The digital communication network 106 may also include computer readable storage media, such as a hard disk drive, an optical drive, non-volatile memory, random access memory ("RAM"), or the like.

The system 100, in another embodiment, includes a server 108 that is in communication with the electronic device 102 using the digital communication network 106. In certain embodiments, the server 108 includes a laptop computer, a desktop computer, a smart phone, a tablet, a mainframe, a smart TV, a touch device, a blade center, or the like. In certain embodiments, the apparatus 104 is located on the server 108. In a further embodiment, portions of the apparatus 104 are located on the electronic device 102 and the server 108. In another embodiment, the server 108 performs all or a portion of the operations associated with conforming passwords to a password policy.

Figure 2:
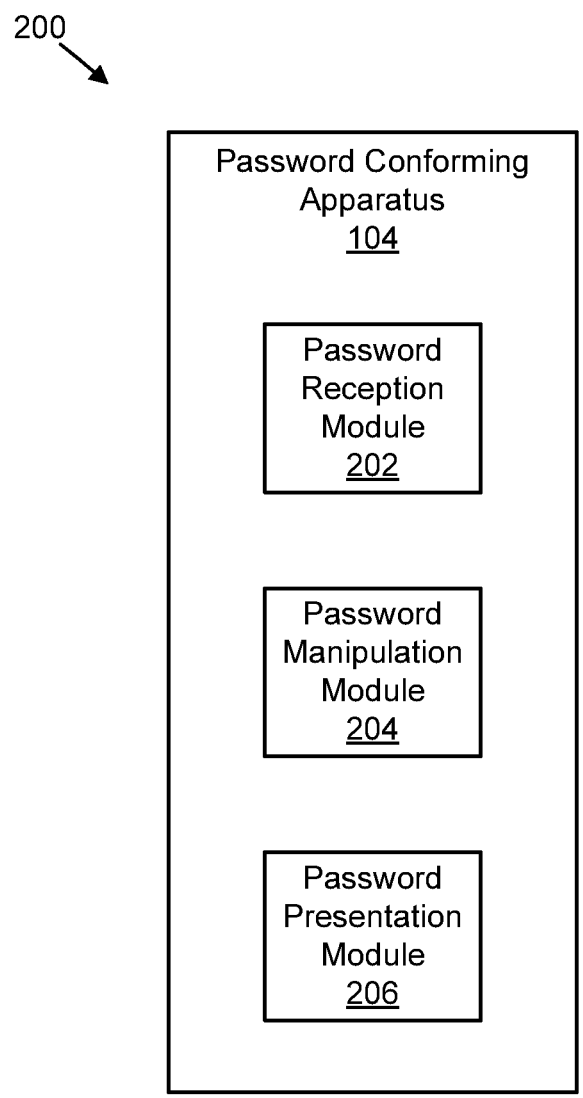
FIG. 2 is a schematic block diagram illustrating one embodiment of an apparatus for conforming a password to a password policy in accordance with the present subject matter.

FIG. 2 depicts one embodiment of an apparatus 200 for conforming passwords to a password policy. The apparatus 200, in certain embodiments, includes a password conforming apparatus 104. The password conforming apparatus 104, in one embodiment, includes a password reception module 202, a password manipulation module 204, and a password presentation module 206, which are described in more detail below.

In one embodiment, the apparatus 200 includes a password reception module 202 that receives a password entered by a user. In another embodiment, the user enters the password in a password entry field of a user interface. In certain embodiments, the user employs one or more input devices to enter the password. For example, a user may be creating a user account on a website, which may require the user to enter a username and a password associated with the user account. The user may use a physical keyboard, a virtual keyboard, a stylus, or the like to key characters that comprise the user's password. Alternatively, the user may use a microphone to speak the characters of the password. In another example, the user may capture an image of the password using a digital camera and the website may employ optical character recognition (OCR) to interpret the individual characters of the password.

In certain embodiments, the password reception module 202 checks if the password conforms to one or more requirements of a password policy. As used herein, a password policy is a set of rules designed to enhance computer security by specifying one or more requirements a password must conform to in order to be valid. The password policy, in certain embodiments, requires passwords to be a certain length, include both upper- and lower-case letters, include numerical characters, include special characters, exclude certain dictionary words, or the like. For example, a website may require users' passwords to start with a capital letter, include at least one number and one special character, and be at least 8 characters in length.

In another embodiment, the password reception module 202 receives a touch pattern password entered by the user. In some embodiments, the password reception module 202 receives a touch pattern password entered on a touch-enabled device, such as a smart phone, tablet computer, laptop, all-in-one computer, or the like. In one embodiment, the password reception module 202 receives a touch pattern password comprising one or more swiping motions, tapping motions, tap-and-hold motions, and/or the like. For example, a user may enter a password on a touch-enabled smart phone by connecting a plurality of virtual dots using one or more swiping motions with a finger, which may involve the user making multiple direction changes with his finger. In another example, a user may enter a password by tapping different areas of a displayed image or by drawing objects, such as the user's initials, a smiley-face, or the like, on the touch-enabled screen using one or more swiping and/or tapping motions.

In one embodiment, the apparatus 200 includes a password manipulation module 204 that manipulates a password entered by a user to create one or more compliant passwords. In certain embodiments, the password manipulation module 204 creates compliant passwords that conform to the one or more requirements of the password policy. In one embodiment, the password manipulation module 204 manipulates the password by appending one or more characters to the end of the password. For example, a user may enter "sally" as the password and the password manipulation module 204 may append one or more characters to make a compliant password "sally1@3$5^" in order to conform the password to the one or more requirements of the password policy.

In another embodiment, the password manipulation module 204 manipulates the password by pre-pending one or more characters to the beginning of the password. For example, a user may enter "sally" as the password and the password manipulation module 204 may pre-pend one or more characters to make a compliant password "1@3$5^sally" in order to conform the password to the one or more requirements of the password policy In a further embodiment, the password manipulation module 204 manipulates the password by inserting one or more characters between the first character and the last character of the password. For example, a user may enter "sally" as the password and the password manipulation module 204 may insert one or more characters to make a compliant password "s1a@1#14y" in order to conform the password to the one or more requirements of the password policy.

In one embodiment, the password manipulation module 204 manipulates the password by substituting one or more characters in place of one or more characters of the password. For example, a user may enter "sally" as the password and the password manipulation module 204 may substitute one or more characters in place of one or more characters of the password to make a compliant password "S@1Ly" in order to conform the password to the one or more requirements of the password policy.

In another embodiment, the password manipulation module 204 uses one or more manipulation methods to create one or more compliant passwords. For example, the password manipulation module 204 may append and pre-prepend characters to the password to create one or more compliant passwords. Thus, the password manipulation module 204 may change the password "sally" to "1@3$sally6&8(", "Q1w2sallyO9i*", or the like. Alternatively, the password manipulation module 204 may append, pre-pend, insert, and substitute characters to create one or more compliant passwords. Thus, the password manipulation module 204 may change the password "sally" to "1s@3$D5b^7&8(", "Qs1w2G^dO9ci*", or the like. In some embodiments, the password manipulation module 204 retains all or a portion of the entered password in one or more compliant passwords. In another embodiment, the password manipulation module 204 creates one or more random passwords that do not resemble any portion of the entered password.

In some embodiments, the password manipulation module 204 uses a predefined pattern of manipulation methods to manipulate the password. For example, the password manipulation module 204 may first append characters, then pre-pend characters, then insert characters, and then substitute characters as the compliant passwords become increasingly stronger and more complex. In one embodiment, the password manipulation module 204 randomly selects one or more manipulation methods to create the one or more compliant passwords. In this way, the password manipulation module 204 may generate compliant passwords in an unpredictable manner, which may provide an extra layer of password security.

In an embodiment including a touch pattern password, the password manipulation module 204 manipulates the user's touch pattern input to create one or more compliant touch pattern passwords. For example, the password manipulation module 204 may receive a touch pattern password that includes a plurality of swiping motions and add, remove, insert, and/or substitute one or more swiping motions. In some embodiments, the password manipulation module 204 creates one or more compliant touch pattern passwords by incorporating various touch pattern motions, such as swiping motions, tapping motions, tap-and-press motions, and/or the like.

The apparatus 200, in another embodiment, includes a password presentation module 206 that presents a list of the one or more compliant passwords to the user. As described below with reference to FIG. 3, the password presentation module 206 may sort passwords based on one or more password characteristics. For example, the password presentation module 206 may sort the list of compliant passwords in ascending order of password strength. Alternatively, the password presentation module 206 may sort the list of compliant passwords in ascending order of time required to crack the passwords.

In certain embodiments, the password presentation module 206 presents a list of one or more compliant textual passwords to the user. In another embodiment, the password presentation module 206 presents a list of one or more compliant touch pattern passwords to the user. In one embodiment, the password presentation module 206 presents one or more graphics, animations, and/or the like, demonstrating compliant touch pattern passwords, which may include one or more swiping motions, tapping motions, and/or the like. In another embodiment, the password presentation module 206 presents a list of compliant touch pattern password motions, e.g., the touch pattern password requires at least six different direction changes instead of five, the touch pattern password requires at least two tapping motions and a swiping motion with at least four direction changes, the touch pattern password cannot contain a pattern of a letter of the user's name, and/or the like.

In certain embodiments, the password presentation module 206 groups the one or more compliant passwords by the manipulation method used. For example, the password presentation module 206 may group one or more compliant passwords created by appending one or more characters. Further, another group of compliant passwords may include passwords that were created by pre-pending characters, substituting characters, and/or inserting characters. The password presentation module 206 may also sort one or more compliant passwords within each group. Thus, within the "append" group, the passwords may be sorted in ascending order of password strength and/or complexity.

In another embodiment, the password presentation module 206 sorts the list of compliant passwords by the extent the one or more compliant passwords meet or exceed the one or more requirements of the password policy. For example, the password presentation module 206 may present one or more compliant passwords that meet the minimum requirements near the top of the list, while one or more compliant passwords that increasingly exceed the minimum password requirements of the password policy are listed in ascending order or complexity. In certain embodiments, the password presentation module 206 presents the one or more requirements of the password policy to the user. In this way, a user may easily see the requirements of the password policy and may customize a password that conforms to the password policy without selecting a compliant password from the list.

In one embodiment, a compliant password is selectable from the list of one or more compliant passwords by a user. In certain embodiments, the user employs an input device, such as a touch screen, a mouse, a stylus, or the like, to select a compliant password from the list. In some embodiments, the user enters the compliant password using another input device, such as a touch screen, keyboard, or the like, in a password entry field of the user interface. In another embodiment, the user selects a password from the list and also enters the password in a password entry field, or re-creates a selected touch pattern, to confirm the selected password. In some embodiments, by entering the password manually, the user is more likely to remember the selected password.

Figure 3:
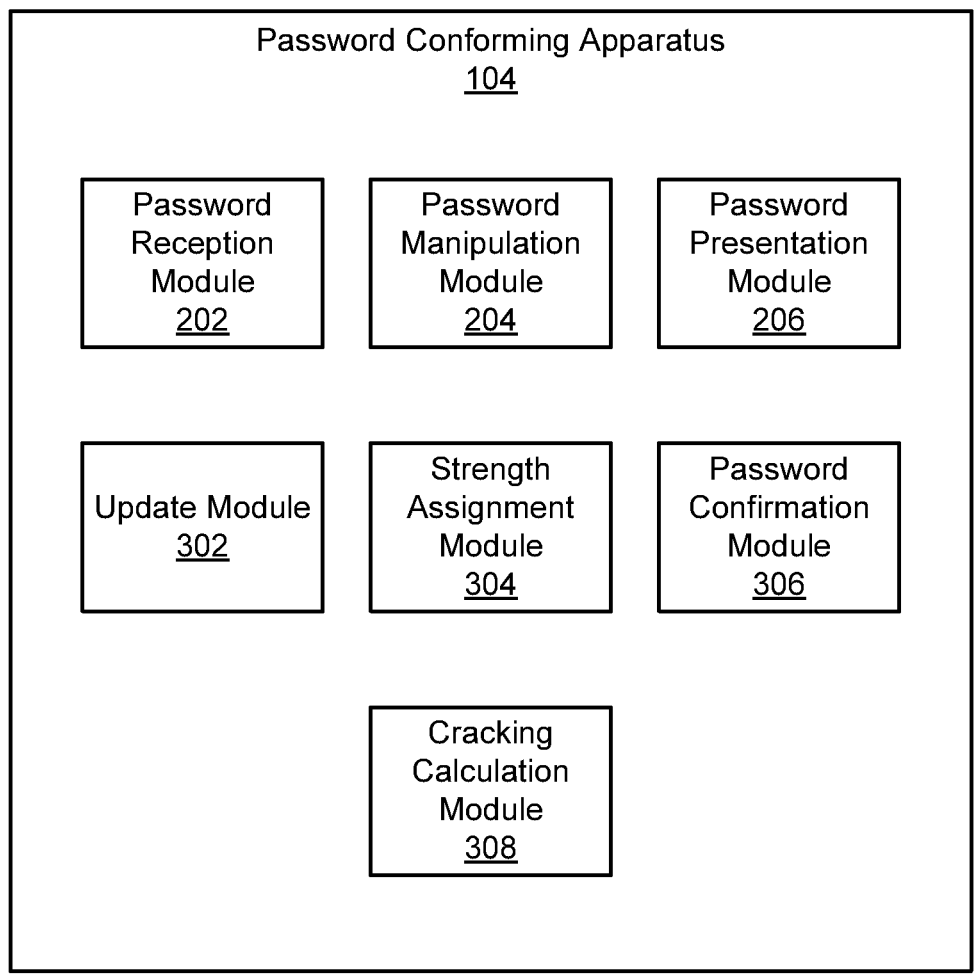
FIG. 3 is a schematic block diagram illustrating another embodiment of an apparatus for conforming a password to a password policy in accordance with the present subject matter.

FIG. 3 depicts another embodiment of an apparatus 300 for conforming passwords to a password policy. The apparatus 300, in one embodiment, includes a password conforming apparatus 104. The password conforming apparatus 104, in another embodiment, includes a password reception module 202, a password manipulation module 204, and a password presentation module 206, which are substantially similar to the password reception module 202, a password manipulation module 204, and a password presentation module 206 described above with reference to FIG. 2. In a further embodiment, the password conforming module 104 includes an update module 302, a strength assignment module 304, a password confirmation module 306, and a cracking calculation module 308, which are described below in more detail.

The apparatus 300, in one embodiment, includes an update module 302 that updates the list of the one or more compliant passwords in response to the user modifying the password. For example, the user may enter a password, such as "sally," which would initially bring up the list of one or more compliant passwords presented by the password presentation module 206 if the password did not conform to the requirements of the password policy. The user may then attempt to modify the password, maybe inserting a symbol to change the password to "s@lly," which may trigger an update of the one or more compliant passwords presented by the password presentation module 206 if the modified password does not conform to the requirements of the password policy.

In certain embodiments, the update module 302 updates the list of one or more compliant passwords in response to the user inputting a character in a password entry field. For example, a user may wish to set their password to "sally" and as the user begins typing "sally," the update module 302 updates the list of compliant passwords displayed by the password presentation module 206. Thus, after "s" is typed, one or more compliant passwords may be displayed. Thereafter, an "a" may be entered, such that the password comprises "sa" and the update module 302 may refresh the list of one or more compliant passwords in response to the manipulation module 204 creating one or more compliant passwords based on the added character.

In some embodiments, update module 302 updates the list of compliant passwords in response to the password being modified. A user may modify a password by entering a new character, deleting a character, changing a character, and/or the like. For example, a user may add a new character to the beginning of the password, which would trigger the update module 302 to refresh the list of compliant passwords. Alternatively, the user may delete a character or change the case of a character (e.g., from lower-case to upper-case), which may also trigger the update module 302 to update the list of compliant passwords.

In certain embodiments, the update module 302 updates the list of compliant passwords in real-time as the password is modified. For example, after a character is added, deleted, changed, and/or the like, the update module 302 may update the list of compliant passwords. In another embodiment, the update module 302 updates the list of compliant passwords in response to a predefined period of time expiring since the user modified the password. For example, the update module 302 may update the list of compliant passwords after three seconds have elapsed since the user modified the password.

In one embodiment, the apparatus 300 includes a strength assignment module 304 that assigns a password strength rating to the one or more compliant passwords. As used herein, the strength of a password may be a measure of the effectiveness of a password in resisting guessing and brute-force attacks. The strength of a password may be dependent on the length, complexity, and unpredictability of the password. The strength assignment module 304, in certain embodiments, determines the strength of a compliant password using different password strength assessment schemes, such as the average number of guesses to find the password, information entropy, or the like.

The strength assignment module 304, in certain embodiments, assigns a strength rating based on the one or more requirements of the password policy. For example, the strength assignment module 304 may rate the strength of a compliant password relative to the requirements of the password policy. Thus, a password that is considered strong for one password policy may be considered weak for a password policy that enforces more restrictive requirements, such as a longer password length.

In another embodiment, the password presentation module 206 presents a list of password strength ratings as determined by the strength assignment module 304. In one embodiment, the strength assignment module 304 may provide password strength ratings as a numerical value, such as a value between 1 and 100, where 1 is weak and 100 is strong. In other embodiments, the password presentation module 206 may present a color-coded strength meter associated with each compliant password based on the numerical strength rating determined by the strength assignment module 304. For example, a weak password may be displayed with a red mark whereas a strong password may be displayed with a green mark. In some embodiments, different shades of red, green, yellow, or the like, are used for compliant passwords of various strengths. In some embodiments, a compliant password with the weakest strength meets the minimum requirements of the password policy.

In one embodiment, the apparatus 300 includes a password confirmation module 306 that confirms the compliant password selected from the list of one or more compliant passwords. In certain embodiments, the user confirms the compliant password that is selected from the list of one or more compliant passwords by entering the selected compliant password in a password confirmation field. For example, a user may enter the compliant password in a password confirmation field on a user interface using an input device such as a keyboard, touch screen, stylus, or the like. In another embodiment, the user confirms a compliant touch pattern password selected from the list by re-creating the selected touch pattern.

In certain embodiments, the password confirmation module 306 confirms the selected compliant password has been entered by the user at least once. For example, the user may select a compliant password from the list of compliant passwords, which may auto-populate the password entry field with the selected compliant password, and enter the password in a password confirmation field to confirm the selected compliant password. In some embodiments, the password confirmation module 306 confirms the selected compliant password has been entered by the user more than once. For example, the user may select a compliant password from the list and enter the selected compliant password in a password entry field and a password confirmation field to confirm the selected compliant password. In some embodiments, having the user enter the selected compliant password helps the user remember the selected compliant password.

In one embodiment, the apparatus 300 includes a cracking calculation module 308 that calculates the time required to crack each compliant password based on a password cracking scheme. As used herein, password cracking refers to the process of recovering passwords from data stored in a computer readable storage medium. In one embodiment, the cracking calculation module 308 processes each compliant password created by the password manipulation module 204 to determine how long it may take to crack the password given a password cracking scheme. In certain embodiments, the cracking calculation module 308 employs a one or more password cracking schemes to calculate more than one cracking times for a compliant password. In another embodiment, the password cracking scheme includes brute force (e.g., trying every possible key or password), dictionary attacks, pattern checking, word list substitution, or the like.

In some embodiments, the password presentation module 206 displays the time required to crack a compliant password, as calculated by the cracking calculation module 308, alongside the associated compliant password. In other embodiments, the password presentation module 206 sorts the list of compliant passwords by the time required to crack the passwords. In general, unauthorized users may attempt to misappropriate a password using one of the above mentioned password cracking schemes. By displaying the time required to crack a compliant password, a user may easily determine the strength of each compliant password and be able to select a strong password that may be difficult to crack.

Figure 4:
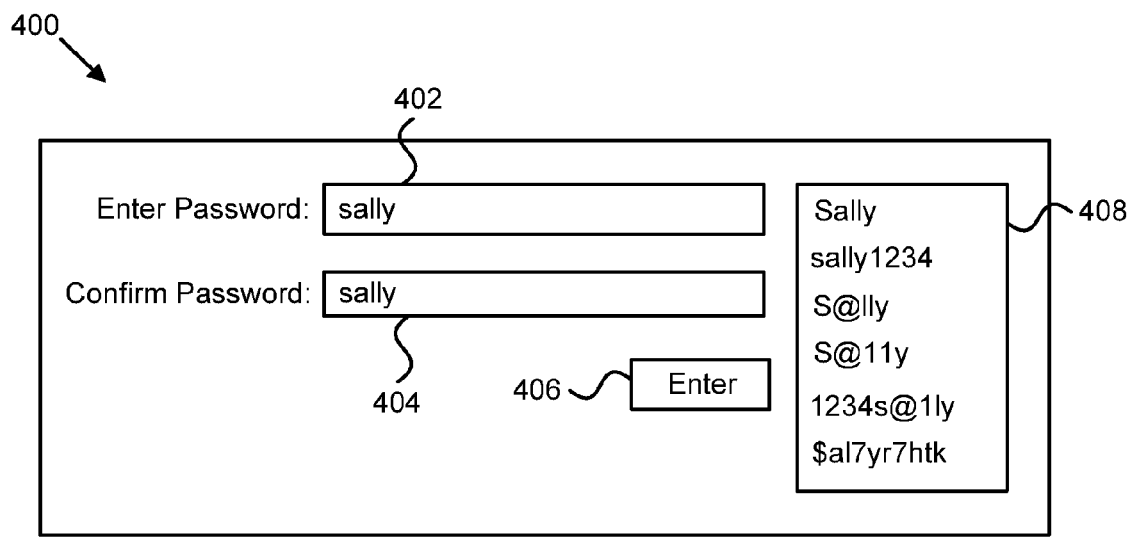
FIG. 4 is a perspective view illustrating one embodiment of a system for conforming a password to a password policy in accordance with the present subject matter.

FIG. 4 depicts one embodiment of a system 400 for conforming a password to a password policy. In certain embodiments, a user enters a password into a password entry field 402 of a user interface. The user, in some embodiments, also confirms the password by entering the password into a password conformation field 404. In another embodiment, the user submits the password by pressing, for example, a submission button 406 on the user interface.

In response to the user submitting the password, in certain embodiments, the password reception module 202 receives the password and checks whether it meets the requirements of a password policy. If the password does not meet the requirements of the password policy, the password manipulation module 204 manipulates the password to create one or more perspective passwords. As described above, the password manipulation module 204 may manipulate the password using one or more password manipulation methods, such as appending, pre-pending, substituting, and/or inserting characters. In some embodiments, the password manipulation module 204 also removes/deletes one or more characters. The password presentation module 206, in one embodiment, presents a list 408 of the one or more compliant passwords.

In certain embodiments, the password presentation module 206 presents a list 408 of one or more compliant passwords in response to a user entering one or more characters in the password entry field 402. For example, as a user begins to type a password in the password entry field 402, the password reception module 202 may receive the characters as they are typed, the password manipulation module 204 may create one or more compliant passwords based on the typed characters in the password entry field 402, and the password presentation module 206 may present the list 408 of compliant passwords. In another embodiment, the update module 302 updates the list 408 of compliant passwords in real-time in response to the user modifying the password in the password entry field 402. In certain embodiments, the update module 302 delays a predetermined amount of time after a user modifies the password before updating the list 408 of compliant passwords.

Figure 5:
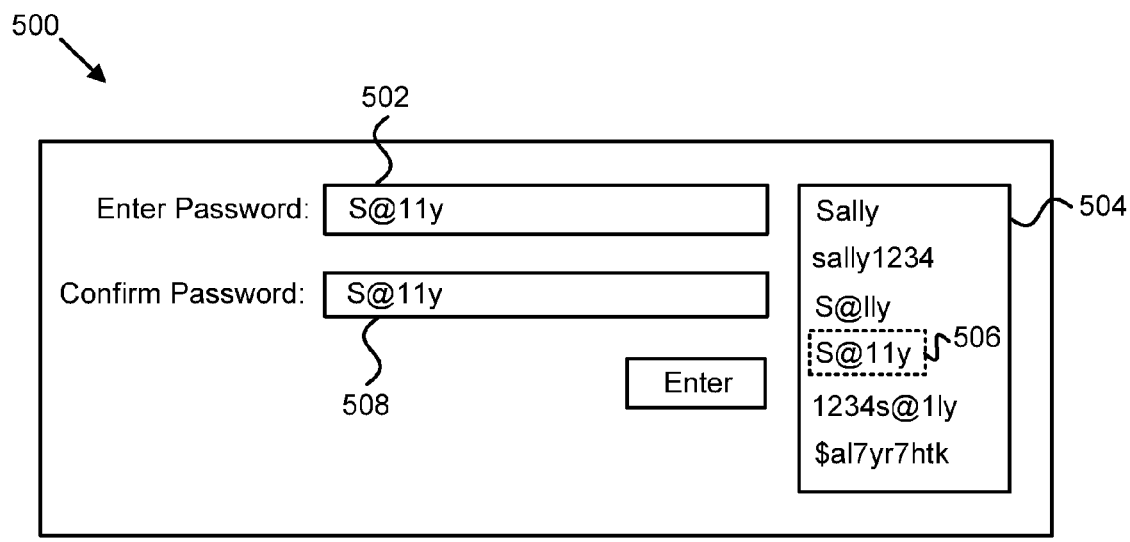
FIG. 5 is a perspective view illustrating another embodiment of a system for conforming a password to a password policy in accordance with the present subject matter.

FIG. 5 depicts another embodiment of a system 500 for conforming a password to a password policy. In one embodiment, a user selects a password 506 from the list of compliant passwords 504, which may auto-populate the password entry field 502. In certain embodiments, the user enters the selected password in a password confirmation field 508 and the password confirmation module 306 verifies the entered password and the selected password match. In certain embodiments, requiring the user to enter the selected password helps the user to remember the password. In one embodiment, the user may modify the selected password 506 in the password entry field 502 to further customize the selected password 506 to meet their preferences.

Figure 6:
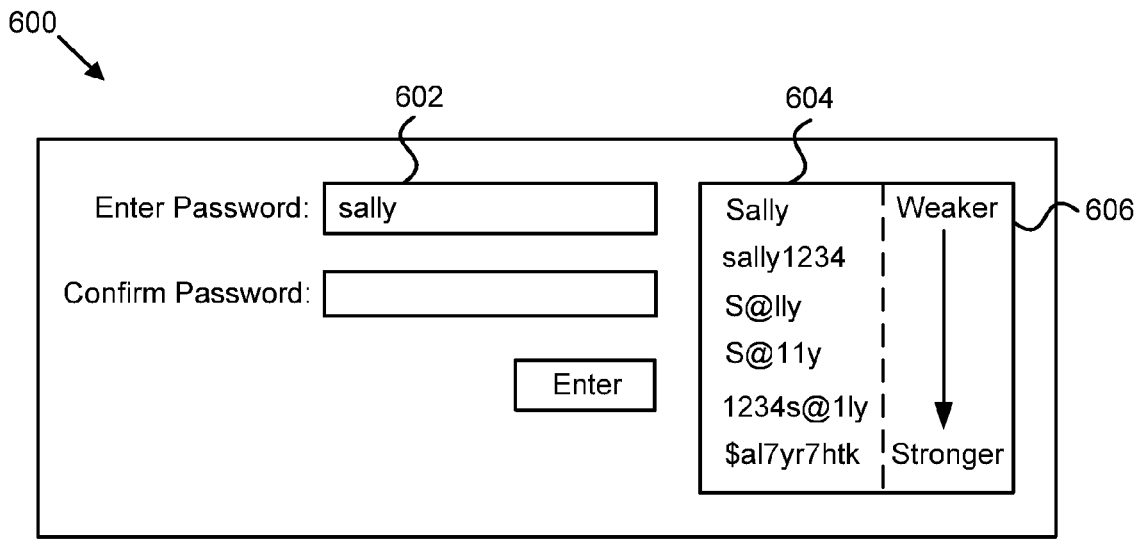
FIG. 6 is a perspective view illustrating a further embodiment of a system for conforming a password to a password policy in accordance with the present subject matter.

FIG. 6 depicts a further embodiment of a system 600 for conforming a password to a password policy. In one embodiment, the user enters a password in a password entry field 602. The password presentation module 206, in one embodiment, presents a list of compliant passwords 604. In some embodiments, the compliant passwords contain at least a portion of the password entered by the user. In another embodiment, the strength assignment module 304 calculates the strength of each compliant password in the list 604 and assigns a strength rating to each compliant password.

In some embodiments, the password presentation module 206 displays 606 the password strength alongside each compliant password. In the depicted embodiment, the password presentation module 206 sorts the list of compliant passwords in ascending order of strength (e.g., from weakest to strongest). In one embodiment, the compliant password with the weakest strength rating conforms to the minimum requirements of the password policy. In other embodiments, the password presentation module 206 groups one or more compliant passwords that have the same strength rating. In certain embodiments, the strength assignment module 304 displays a color-coded scheme that allows a user to visually compare the strengths of the compliant passwords (e.g., a red mark indicating a weak password and a green mark indicating a strong password).

Figure 7:
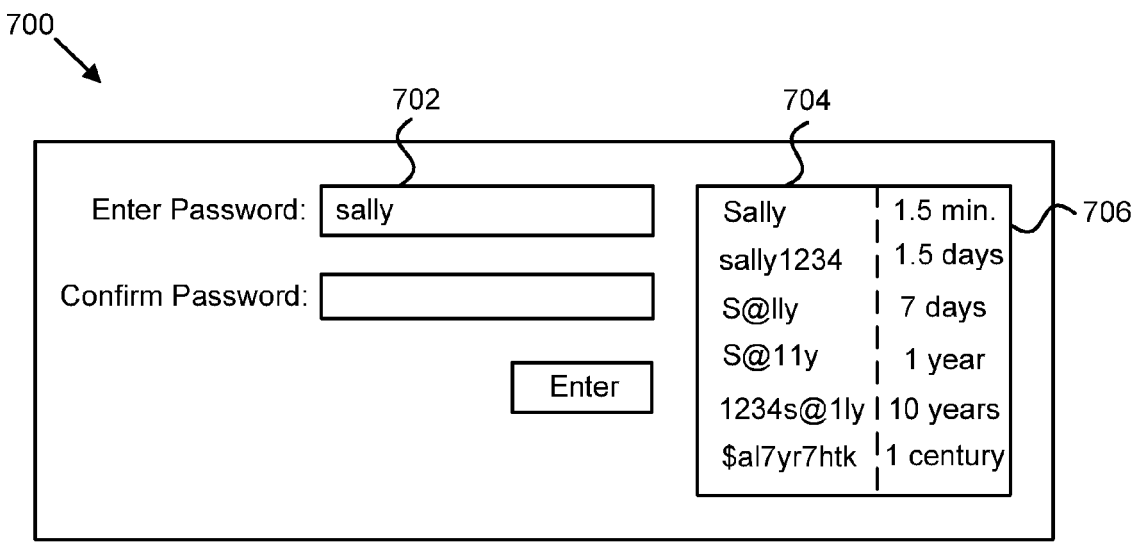
FIG. 7 is a perspective view illustrating another embodiment of a system for conforming a password to a password policy in accordance with the present subject matter.

FIG. 7 depicts another embodiment of a system 700 for conforming a password to a password policy. The depicted embodiment again illustrates a password that is entered in a password entry field 702 and a list 704 of compliant passwords. In certain embodiments, a measurement of the time to crack each compliant password may be displayed 706 alongside each compliant password. In one embodiment, the cracking calculation module 308 calculates the time required to crack each compliant password using one or more password cracking schemes, as described above.

Moreover, in the depicted embodiment, the password presentation module 206 sorts the list of compliant passwords in ascending order of time to crack (e.g., from shortest time to longest time), where the compliant passwords with the longest cracking times exceed the minimum requirements of the password policy. In some embodiments, the cracking calculation module 308 displays 706 one or more cracking times associated with each compliant password grouped by the password cracking scheme used to calculate the cracking times. For example, the cracking calculation module 308 may display three columns representing three different cracking calculation methods, where each column displays cracking times associated with each compliant password. In this manner, a user may select a compliant password based on the security preferences of the user, e.g. whether the user wants to defend against brute force attacks, dictionary attacks, or the like. In some embodiments, the cracking times calculated by the cracking calculation module 308 and the strength ratings assigned by the strength assignment module 304 may be displayed at the same time. In one embodiment, a user may sort the list of compliant passwords by password strength or by cracking times.

Figure 8:
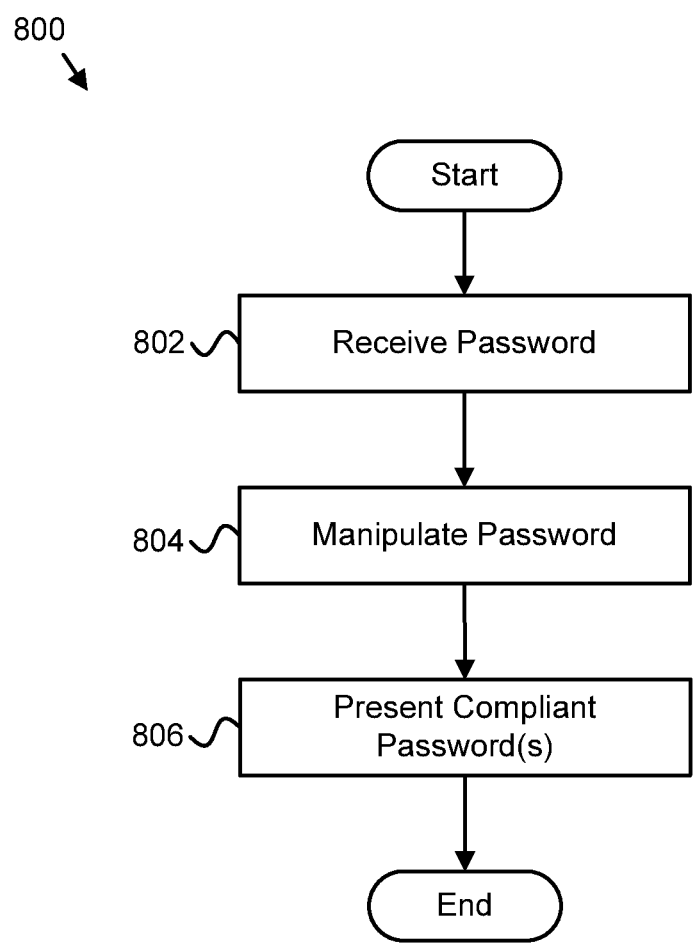
FIG. 8 is a schematic flow chart diagram illustrating one embodiment of a method for conforming a password to a password policy in accordance with the present subject matter.

FIG. 8 depicts one embodiment of a method 800 for conforming a password to a password policy. In one embodiment, a password reception module 202 receives 802 a password entered by a user. In some embodiments, the password entered by the user does not conform to the requirements of a password policy. In another embodiment, a password manipulation module 804 manipulates the password to create one or more compliant passwords. The one or more compliant passwords, in one embodiment, conform to one or more requirements of a password policy. In one embodiment, a password presentation module 206 presents 806 a list of the one or more compliant passwords to the user. In certain embodiments, a compliant password is selectable from the list by a user.

Figure 9:
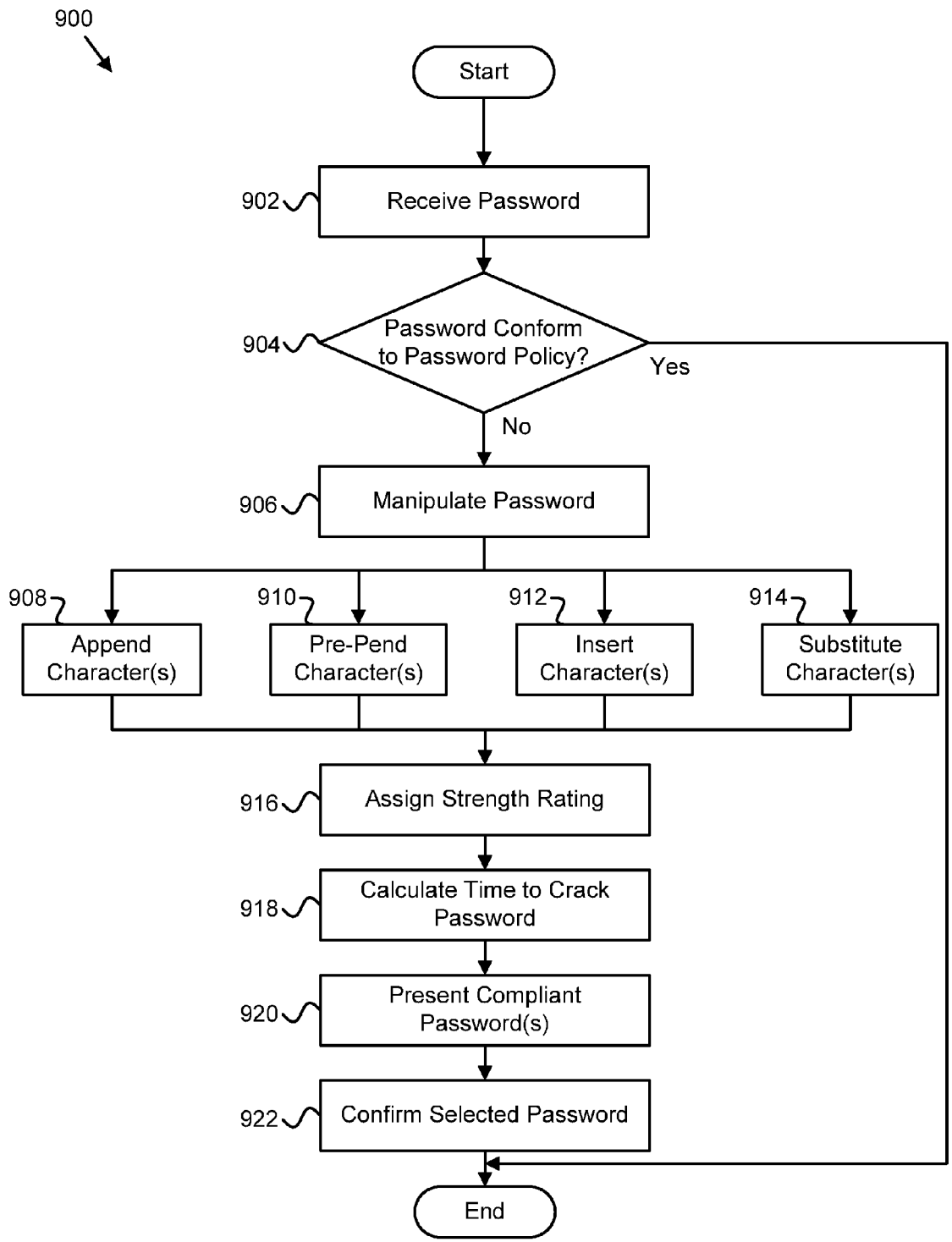
FIG. 9 is a schematic flow chart diagram illustrating another embodiment of a method for conforming a password to a password policy in accordance with the present subject matter.

FIG. 9 depicts one embodiment of another method 900 for conforming a password to a password policy. In one embodiment, a password reception module 202 receives 902 a password entered by a user and determines 904 whether the password conforms to one or more requirements of a password policy. If the password does conform to the one or more requirements of the password policy, then the password is valid and the method 900 ends.

If the password reception module 202 determines 904 the password does not conform to the one or more requirements of the password policy, a password manipulation module 204 manipulates 906 the password to create one or more compliant passwords that conform to the one or more requirements of the password policy. The password manipulation module 204 manipulates 906 the password using one or more manipulation methods to conform the password to the one or more requirements of the password policy. In one embodiment, the password manipulation module 204 appends 908 one or more characters to the end of the password. In another embodiment, the password manipulation module 204 pre-pends 910 one or more characters to the beginning of the password. In a further embodiment, the password manipulation module 204 inserts 912 one or more characters between the first character and the last character of the password. In one embodiment, the password manipulation module 204 substitutes 914 one or more characters in place of one or more characters of the password. In some embodiments, the password manipulation module 204 uses a combination of manipulation methods to create one or more compliant passwords that conform to the requirements of a password policy.

In one embodiment, a strength assignment module 304 assigns 916 a password strength rating to the one or more compliant passwords. The strength assignment module 304, in certain embodiments, assigns 916 a strength rating based on the relative strength of the password in light of the password policy. For example, a password policy may require passwords to have eight characters and another password policy may require passwords to have ten characters. The ten-character password may, generally, be stronger than the eight-character password, but relative to the respective password policy, the passwords may have the same strength rating. In one embodiment, the strength assignment module 304 employs one or more strength calculation methods to determine the relative strength of a compliant password.

In another embodiment, a cracking calculation module 308 calculates 918 the time to crack the one or more compliant passwords. The cracking calculation module 308, in some embodiments, calculates 918 cracking times based on one or more password cracking schemes. In one embodiment, a password presentation module 206 presents 920 a list of the one or more compliant passwords to the user. In certain embodiments, the password presentation module 206 presents 920 a sorted list of one or more compliant passwords to the user. In some embodiments, the password presentation module 206 displays the password strength assigned to a compliant password alongside the compliant password and sorts the list according to password strength (e.g., strongest to weakest, or the like). In another embodiment, the password presentation module 206 displays one or more cracking times associated with a compliant password and sorts the list of compliant passwords by the time to crack a password. In certain embodiments, the presentation module 206 displays both the assigned password strength and the calculated cracking times.

In a further embodiment, a password confirmation module 306 confirms 922 the password selected from the list of one or more passwords. In certain embodiments, the user selects a password from the list of compliant passwords and enters the selected password to confirm the selected password. And the method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving at least a portion of a password entered by a user, the at least a portion of a password not conforming to one or more requirements of a password policy;
   manipulating the at least a portion of the password to create one or more compliant passwords conforming to the one or more requirements of the password policy;
   presenting a list of the one or more compliant passwords to the user wherein a compliant password is selectable by the user; and
   updating the list of one or more compliant passwords in response to the at least a portion of the password being modified, the at least a portion of the password being manipulated in real-time as it is modified to create one or more new compliant passwords, wherein the presented list of compliant passwords is updated with the one or more new compliant passwords in real-time in response to the at least a portion of the password being manipulated.

2. The method of claim 1, wherein the list is updated in response to a predefined period of time expiring after modification of the password.

3. The method of claim 1, further comprising assigning a password strength rating to the one or more compliant passwords wherein the one or more compliant passwords are listed in order of password strength rating, the password strength rating being associated with the password policy.

4. The method of claim 1, further comprising confirming the password selected from the list of one or more passwords.

5. The method of claim 1, further comprising calculating the time required to crack each compliant password based on a password cracking scheme, the time required to crack being presented in the list alongside a related compliant password.

6. The method of claim 1, wherein manipulating the password further comprises appending one or more characters to the end of the password, the one or more appended characters conforming the password to the one or more requirements of the password policy.

7. The method of claim 1, wherein manipulating the password further comprises pre-pending one or more characters to the beginning of the password, the one or more pre-pended characters conforming the password to the one or more requirements of the password policy.

8. The method of claim 1, wherein manipulating the password further comprises inserting one or more characters between the first character and the last character of the password, the one or more inserted characters conforming the password to the one or more requirements of the password policy.

9. The method of claim 1, wherein manipulating the password further comprises substituting one or more characters in place of one or more characters of the password, the one or more substituted characters conforming the password to the one or more requirements of the password policy.

10. An apparatus comprising:
a processor;
a memory storing machine readable code executable by the processor, the machine readable code comprising:
   a password reception module receiving at least a portion of a password entered by a user, the at least a portion of a password not conforming to one or more requirements of a password policy;
   a password manipulation module manipulating the at least a portion of a password to create one or more compliant passwords conforming to the one or more requirements of the password policy;
   a password presentation module presenting a list of the one or more compliant passwords to the user wherein a compliant password is selectable by the user; and
   an update module updating the list of one or more compliant passwords in response to the at least a portion of the password being modified, the at least a portion of the password being manipulated in real-time as it is modified to create one or more new compliant passwords, wherein the presented list of compliant passwords is updated with the one or more new compliant passwords in real-time in response to the at least a portion of the password being manipulated.

11. The apparatus of claim 10, wherein the list is updated in response to a predefined period of time expiring after modification of the password.

12. The apparatus of claim 10, further comprising a strength assignment module assigning a password strength rating to the one or more compliant passwords wherein the one or more compliant passwords are listed in order of password strength rating, the password strength rating being associated with the password policy.

13. The apparatus of claim 10, further comprising a password confirmation module confirming the password selected from the list of one or more passwords.

14. The apparatus of claim 10, further comprising a cracking calculation module calculating the time required to crack each compliant password based on a password cracking scheme, the time required to crack being presented in the list alongside a related compliant password.

15. The apparatus of claim 10, wherein the password reception module receives a touch pattern password entered by the user, the touch pattern password not conforming to one or more touch pattern password requirements of the password policy.

16. The apparatus of claim 10, wherein the manipulation module manipulates the password by appending one or more characters to the end of the password, the one or more appended characters conforming the password to the one or more requirements of the password policy.

17. The apparatus of claim 10, wherein the manipulation module manipulates the password by pre-pending one or more characters to the beginning of the password, the one or more pre-pended characters conforming the password to the one or more requirements of the password policy.

18. The apparatus of claim 10, wherein the manipulation module manipulates the password by inserting one or more characters between the first character and the last character of the password, the one or more inserted characters conforming the password to the one or more requirements of the password policy.

19. The apparatus of claim 10, wherein the manipulation module manipulates the password by substituting one or more characters in place of one or more characters of the password, the one or more substituted characters conforming the password to the one or more requirements of the password policy.

20. A program product comprising a non-transitory computer readable storage medium storing machine readable code executable by a processor to perform:
   receiving at least a portion of a password entered by a user, the at least a portion of a password not conforming to one or more requirements of a password policy;
   manipulating the at least a portion of the password to create one or more compliant passwords conforming to the one or more requirements of the password policy;
   presenting a list of the one or more compliant passwords to the user wherein a compliant password is selectable by the user; and
   updating the list of one or more compliant passwords in response to the at least a portion of the password being modified, the at least a portion of the password being manipulated in real-time as it is modified to create one or more new compliant passwords, wherein the presented list of compliant passwords is updated with the one or more new compliant passwords in real-time in response to the at least a portion of the password being manipulated.

* * * * *